US012645074B1

(12) United States Patent
Chen et al.

(10) Patent No.: US 12,645,074 B1
(45) Date of Patent: Jun. 2, 2026

(54) HYBRID LENS ASSEMBLY THAT USES A METALENS AND REFRACTIVE LENSES OF A SINGLE MATERIAL TYPE

(71) Applicants: Wei Ting Chen, Plainsboro, NJ (US); Qing Wang, Plainsboro, NJ (US)

(72) Inventors: Wei Ting Chen, Plainsboro, NJ (US); Qing Wang, Plainsboro, NJ (US)

( * ) Notice: Subject to any disclaimer, the term of this patent is extended or adjusted under 35 U.S.C. 154(b) by 270 days.

(21) Appl. No.: 18/641,348

(22) Filed: Apr. 20, 2024

Related U.S. Application Data

(60) Provisional application No. 63/461,307, filed on Apr. 23, 2023.

(51) Int. Cl.
*G02B 27/00* (2006.01)
*G02B 1/00* (2006.01)

(52) U.S. Cl.
CPC ......... *G02B 27/0025* (2013.01); *G02B 1/002* (2013.01)

(58) Field of Classification Search
CPC ............................ G02B 27/0025; G02B 1/002
USPC ........................................................ 359/708
See application file for complete search history.

(56) References Cited

U.S. PATENT DOCUMENTS

| | | | | |
|---|---|---|---|---|
| 5,621,574 A | * | 4/1997 | Foo ...................... | G02B 3/0087 |
| | | | | 359/776 |
| 5,978,159 A | * | 11/1999 | Kamo ................ | G02B 27/4211 |
| | | | | 359/570 |
| 10,126,466 B2 | | 11/2018 | Lin et al. | |
| 10,670,782 B2 | | 6/2020 | Arbabi et al. | |
| 11,079,520 B2 | | 8/2021 | Tsai et al. | |
| 11,686,885 B2 | | 6/2023 | Tsai et al. | |
| 11,733,535 B2 | | 8/2023 | Aieta et al. | |
| 2025/0020829 A1 | * | 1/2025 | Hon ................... | G02B 27/4211 |

FOREIGN PATENT DOCUMENTS

| | | | | | |
|---|---|---|---|---|---|
| JP | 2016520860 A | * | 7/2016 | ......... | G02B 27/0062 |

* cited by examiner

*Primary Examiner* — Mohammed A Hasan
(74) *Attorney, Agent, or Firm* — LaMorte & Associates, PC

(57) ABSTRACT

A hybrid lens assembly that corrects for chromatic aberrations and monochromatic aberrations in passing light. A plurality of refractive lens elements are provided that are fabricated from a common refractive material. The refractive lens elements are shaped and oriented to optically correct for monochromatic aberrations. A metalens is provided. The metalens optically corrects for the chromatic aberrations. The result is a hybrid lens assembly that contains both refractive lenses and a metalens. The result is an overall lens assembly that is apochromatic yet is smaller and easier to produce than assemblies that only use refractive lenses. The metalens also corrects for wavefront errors and focal shifts that result from using refractive lens of only one material type, therein making the use of only one refractive material practical in the manufacture of lens assemblies.

20 Claims, 8 Drawing Sheets

HYBRID LENS ASSEMBLY THAT USES A METALENS AND REFRACTIVE LENSES OF A SINGLE MATERIAL TYPE

RELATED APPLICATIONS

This application claims the benefit of U.S. Provisional Application No. 63/461,307, filed Apr. 23, 2023.

BACKGROUND OF THE INVENTION

1. Field of the Invention

In general, the present invention relates to lens assemblies that are designed to optically correct for chromatic and monochromatic aberrations. More particularly, the present invention relates to lens assemblies that use metasurfaces and/or metalenses to correct for optical aberrations.

2. Prior Art Description

When light passes through a lens, the material of the lens causes some degree of refraction in the passing light. The angle of refraction depends upon the material and configuration of the lens. If the light is passing through an assembly containing multiple lenses, the errors of the angle of refraction of transmitted light can become significant and can cause chromatic aberrations, wherein different frequencies of light focus at different points. In cameras and telescopes, chromatic aberration can produce ghost images or blurred images where colors fringe at high-contrast edges. In addition to chromatic aberrations, lens assemblies also experience monochromatic aberrations. Monochromatic aberrations are caused by the geometry of the lens. Monochromatic aberrations include spherical aberrations, coma, astigmatism, field curvature, and image distortion.

In order to prevent chromatic and monochromatic aberrations in a lens assembly, corrective lenses are often included in the lens assembly. The corrective lenses are designed using shapes and materials that, together, correct for both monochromatic aberrations and chromatic aberrations. Corrective lenses are designed specifically with chromatic focal length shifts, wherein they correct for aberrations in two frequencies of light, or in three frequencies of light.

Lens assemblies that have a large field-of-view are particularly vulnerable to chromatic and monochromatic aberrations. This is especially true near the outer edges of the lens assembly. Accordingly, lens assemblies with a large field-of-view often contain corrective lenses. Many lens materials are available for making corrective lenses in the visible region. Multiple lens elements of different materials are combined to effectively correct chromatic and monochromatic aberrations in visible light. However, far fewer lens materials are effective in correcting chromatic and monochromatic aberrations in infrared light. This is especially true for mid-infrared light and far-infrared light. Various oxide-based glasses are typically used in corrective lens that correct aberrations in visible light. However, such glass material becomes absorptive and unusable in the mid-infrared and far-infrared regions of spectral light. This limitation in the availability of effective glass material makes correcting aberrations in infrared optics highly problematic.

The conventional approach to correct chromatic aberrations in systems that pass infrared light is to use a corrective lens system that pairs a convex lens of one material with a concave lens of another material. The downside of this approach is that the use of a concave lens inherently reduces the focusing power of the overall lens assembly. As a consequence, more convex lenses are needed to compensate and realize a required f-number or numerical aperture. The use of more lenses increases the cost, size, and manufacturing complexity of the overall lens assembly. In addition, to provide good color transmission over a large bandwidth, the lens assembly usually needs to exhibit apochromatic behavior throughout the bandwidth of passing light. For systems that pass mid-infrared light, such apochromatic focusing is difficult to achieve due to the strong dispersive nature of infrared materials and limited number of effective lens materials that are available. Also, since the alignment accuracy and the structural complexity of a lens assembly scales with the total number of lens elements, the effort for aligning and assembling lens elements can cost significantly more than the lenses being used.

One technique to reduce the number of refractive lens elements in an optical system is to replace one or multiple refractive lenses with a metalens. Metalenses are sub-wavelength-spaced structures that are fabricated on a microchip using semiconductor techniques. In U.S. Pat. No. 10,670, 782 to Arbabi et al., a metalens is shown that is designed to correct chromatic aberrations in light that is in the visible spectrum and pre-collimated. In the Arbahy Patent, the metalens can correct for chromatic aberrations in the visible light. However, the metalens does not correct for monochromatic aberrations. Thus, the system requires the use of pre-collimated light.

A need therefore exists for a hybrid lens system that can correct for monochromatic aberrations using a refractive lens and at the same time, chromatic aberrations using a metalens. A need also exists for a hybrid lens system that can effectively correct for chromatic and monochromatic aberrations in systems that pass infrared light. Lastly, a need exists for a hybrid lens system that can be manufactured using a low number of refractive lenses and refractive lenses that are all made from the same material, therein reducing the costs of manufacturing and assembly. These needs are met by the present invention as described and claimed below.

SUMMARY OF THE INVENTION

The present invention is a lens assembly and its method of fabrication. The lens assembly corrects for chromatic aberrations and monochromatic aberrations in light passing through the lens assembly, and is especially useful for use with infrared light. The lens assembly has a plurality of refractive lens elements that are preferably fabricated from a common refractive material, whose group velocity dispersion is zero at a wavelength within the bandwidth of interest. The refractive lens elements are shaped and oriented to optically correct for at least some of the monochromatic aberrations.

A metalens is positioned between two of the refractive lens elements. The light passing through the refractive lens elements also passes through the metalens. The metalens optically corrects for at least some of said chromatic aberrations. The result is a hybrid lens assembly that contains both refractive lenses and a metalens. The refractive lenses correct for monochromatic aberrations and the metalens corrects for chromatic aberrations. The result is an overall lens assembly that is apochromatic yet is smaller and easier to produce than assemblies that only use refractive lenses.

In addition, the use of a common material in the refractive lenses produces wavefront errors and focal shifts in the passing light. The metalens can correct the light for these distortions, therein making the use of only one glass material practical in the manufacture of lens assemblies.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention assembly and methodology can be embodied in many ways, only two exemplary embodiments are illustrated. The exemplary embodiments are being shown for the purposes of explanation and description. The exemplary embodiments are selected in order to set forth some of the best modes contemplated for the invention. The illustrated embodiments, however, are merely exemplary and should not be considered limitations when interpreting the scope of the appended claims.

Figure 1:
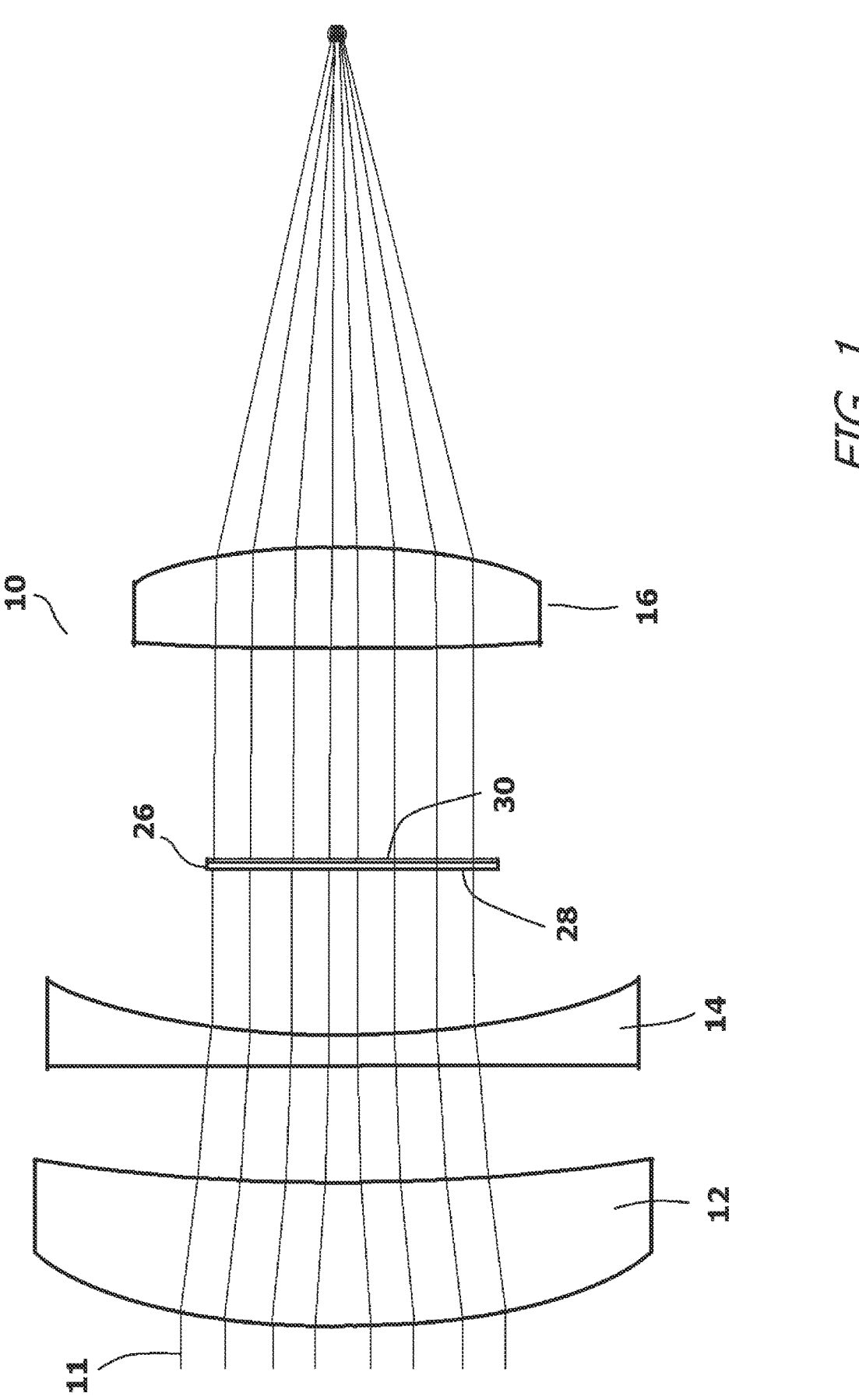
FIG. 1 shows a first exemplary embodiment of a lens assembly that contains both refractive lenses and a metalens.

Referring to FIG. 1, an exemplary lens assembly 10 is shown. The lens assembly 10 can be used in a camera, telescope, microscope, or the like. In the preferred embodiment, the lens assembly 10 is for use in an optical system that is imaging infrared light 11 from the mid-infrared range to the far-infrared range. In the illustrated embodiment, the lens assembly 10 has refractive lens elements 12, 14, 16 that are generally configured into a Cooke triplet. The lens configuration for a Cooke triplet was first described in U.S. Pat. No. 568,052. The lens configuration for a Cooke triplet is known for its optical ability to eliminate most monochromatic distortion at the edges of the image. Accordingly, Cooke triplets and variations thereof have been widely used in cameras, telescopes, and microscope for over a century.

The refractive lens elements 12, 14, 16 in the lens assembly 10 include a plano/concave lens 14 that is interposed between two convex/concave lenses 12, 16. Being configured into a Cooke triplet, the refractive lens elements 12, 14, 16 in the lens assembly 10 have the optical ability to correct for monochromatic aberrations. In the illustrated example, the lens assembly 10 is designed for the mid-infrared region with f/4 and 50-degree field of view.

Unlike most Cooke triplets, the three refractive lens elements 12, 14, 16 of the lens assembly 10 are all made of the same refractive material. The preferred refractive material is zinc selenide (ZnSe). Other glasses that are zinc based materials, such as zinc sulfide can be used for systems that primarily pass light near the mid-infrared that have wavelengths between 3 um and 5 um. For systems that pass light near the far-infrared that have wavelengths between 8 um and 14 um, chalcogenide glasses can be used that contain germanium, antimony, arsenic, and selenium. Such refractive material is used in the Black Diamond brand infrared lenses manufactured by LightPath Technologies of Orlando, Florida. The three refractive lens elements 12, 14, 16 of the lens assembly 10 have a group velocity dispersion that is zero at a wavelength within the bandwidth of interest. Group velocity dispersion is an intrinsic property of refractive material, which is given by the following formula.

$$-\frac{\lambda}{c}\frac{\partial^2 n}{\partial \lambda^2}.$$

Formula 1

Where $\lambda$ is the wavelength of light in vacuum, c is light speed and m is the index of refraction of the refractive material.

Figure 2:
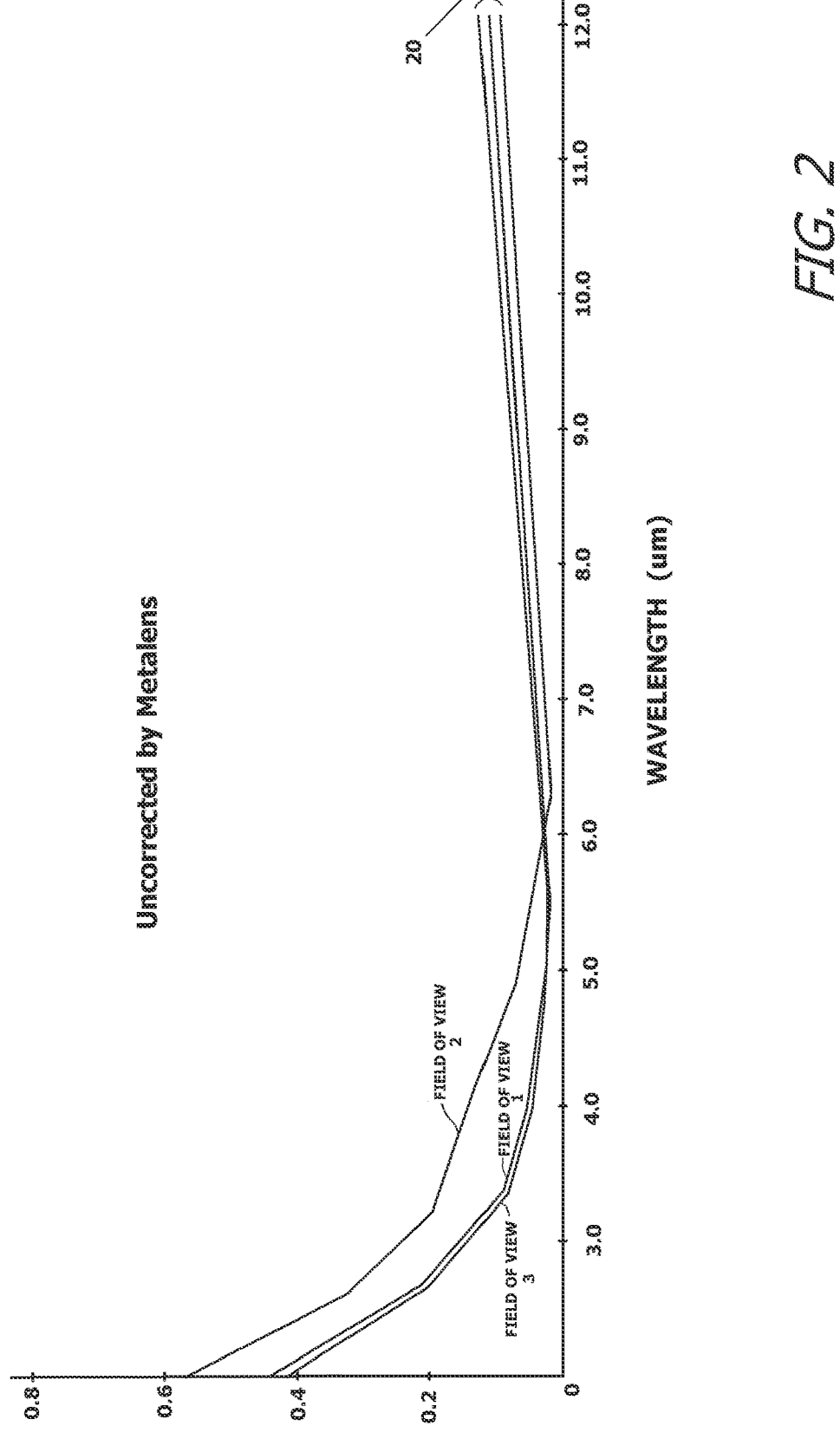
FIG. 2 is a graph that illustrates the wavefront errors created by the use of one glass material on the embodiment of FIG. 1, without a metalens.
Figure 3:
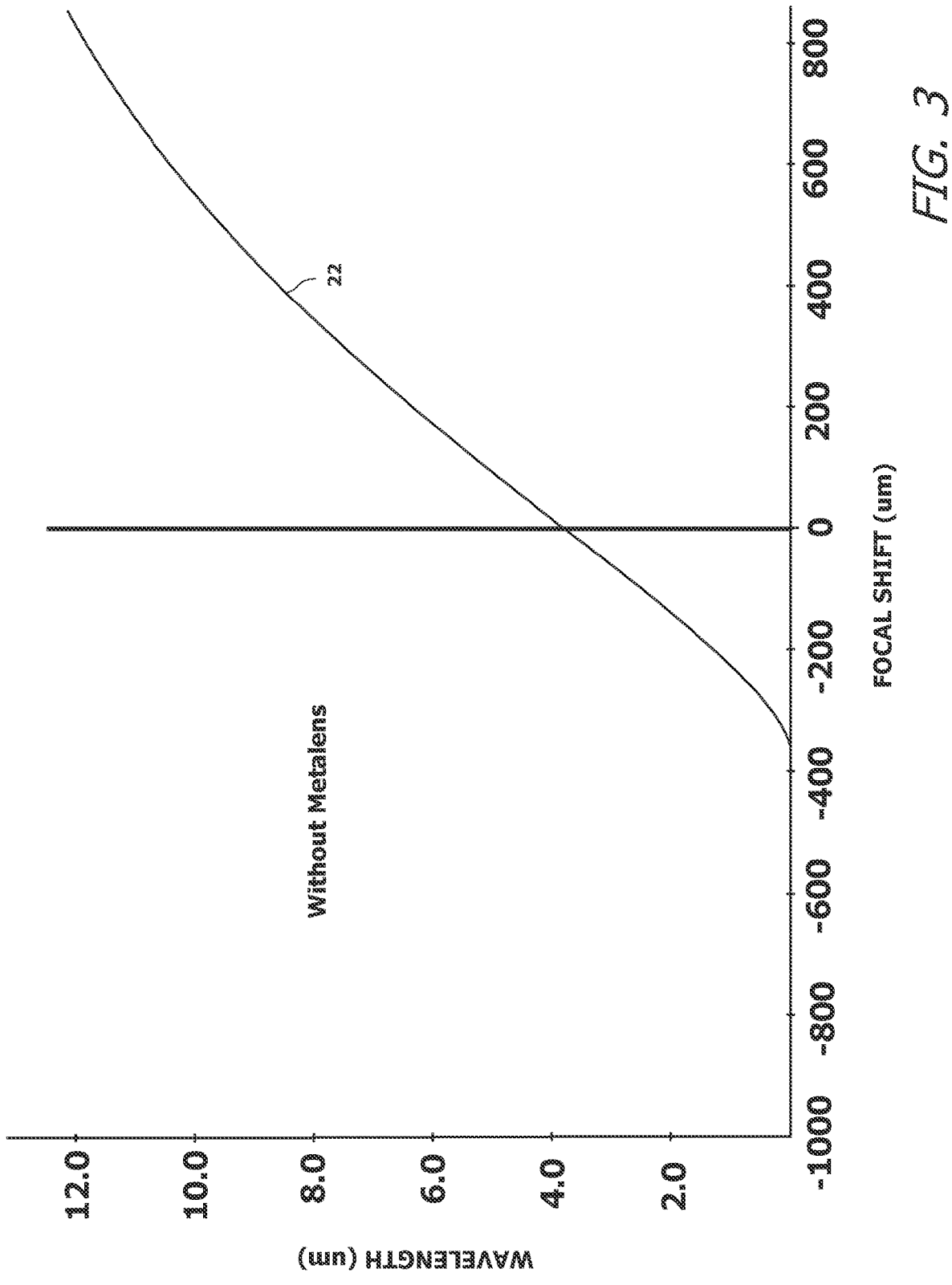
FIG. 3 is a graph that illustrates the focal shift errors created by the use of one glass material in the embodiment of FIG. 1; without a metalens.

Referring to FIG. 2 in conjunction with FIG. 1, it will be understood that since all the refractive lens elements 12, 14, 16 are made from the same refractive material, there is an increase in its wavefront error towards long and short wavelengths. See line grouping 20 in FIG. 2. Additionally, referring to FIG. 3 in conjunction with FIG. 2, the use of a single refractive material type in the refractive lens elements 12, 14, 16 creates a 1.1 mm shift in focal length from wavelength 2 um to 12 um. See line 22 in FIG. 3.

A metalens 26 is included in the lens assembly 10. The metalens 26 is positioned between the second lens element 14 and the third lens element 16. The metalens 26 has a substrate 28 that is transparent to the infrared frequencies of light being passed. A metasurface 30 is formed on the substrate 28. The metasurface 30 consists of sub-wavelength-spaced structures that are fabricated onto the substrate 28 using semiconductor deposition, lithography, and etching techniques. The metasurface 30 is designed to create optical effects on the passing infrared light that correct the inherent chromatic aberration of the refractive lens elements 12, 14, 16 as well as the wavefront errors and focal length shifts created by the single refractive material being used.

Figure 4:
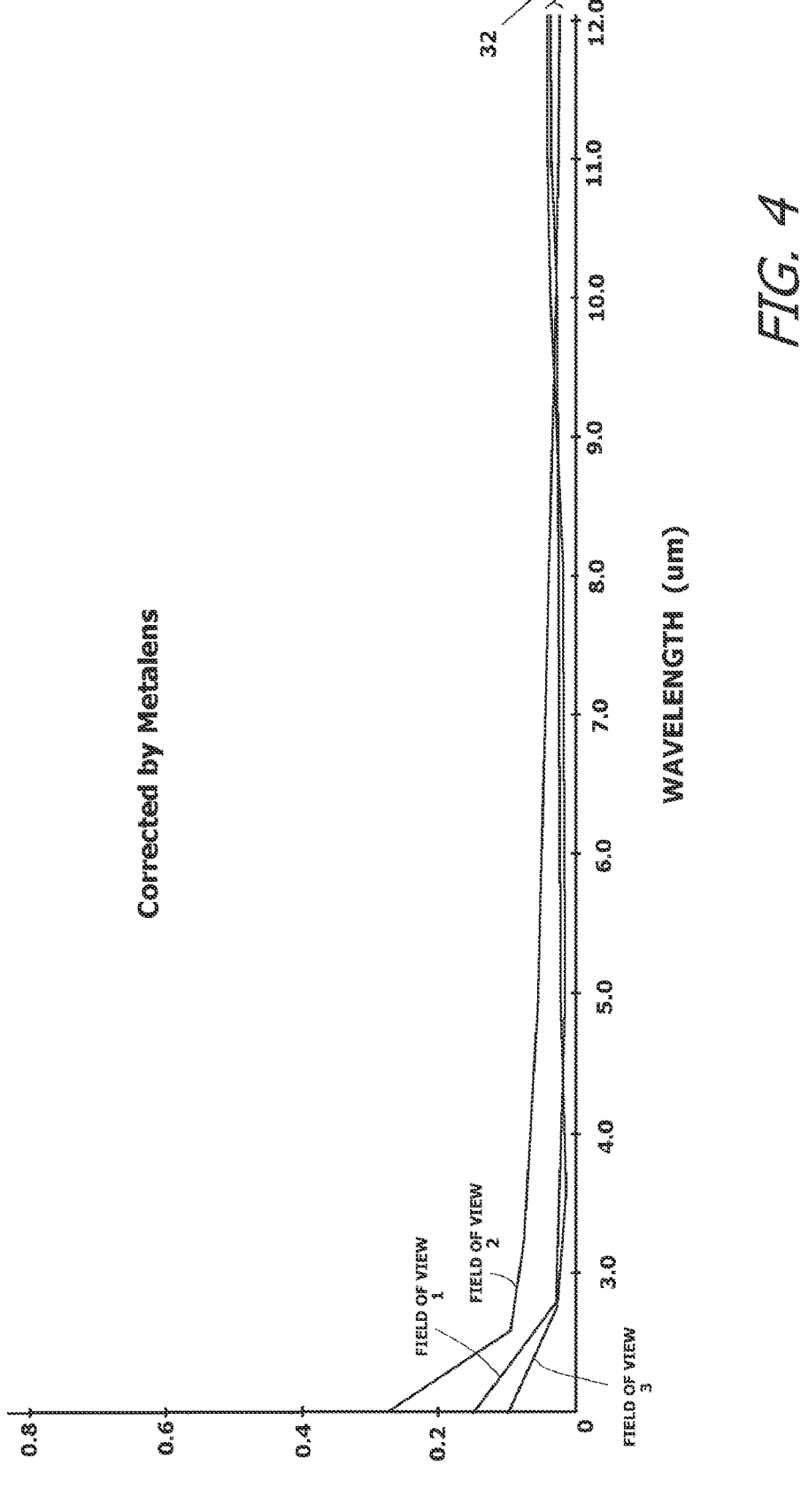
FIG. 4 is a graph that illustrates the correction in wavefront errors that are produced by a metalens, for comparison with the graph of FIG. 2.

Referring to FIG. 4 and comparing FIG. 4 to FIG. 2, it can be seen that the presence of the metalens 26 corrects the wavefront error towards long and short wavelengths. See line grouping 32 in FIG. 4 in comparison to line grouping 20 in FIG. 2. Additionally, referring to FIG. 5 and comparing FIG. 5 to FIG. 3, it can be seen that the use of the metalens 26 corrects the focal length shift. See line 34 in FIG. 5 with the line 22 in FIG. 3 with attention to the large change in scale between graphs. Accordingly, with reference to FIG. 1, FIG. 2, FIG. 3, FIG. 4 and FIG. 5, it will be understood that the presence of the metalens 26 corrects for both inherent chromatic aberrations and for the added optical aberrations that are created by the use of a single refractive material type in the refractive lens elements 12, 14, 16. Since the metalens 26 addresses overall chromatic aberrations, the refractive lens elements 12, 14, 16 are only required to correct monochromatic aberrations, thereby enabling refractive lens elements to be used that can provide a broader the field of view than has been previously practical.

Figure 6:
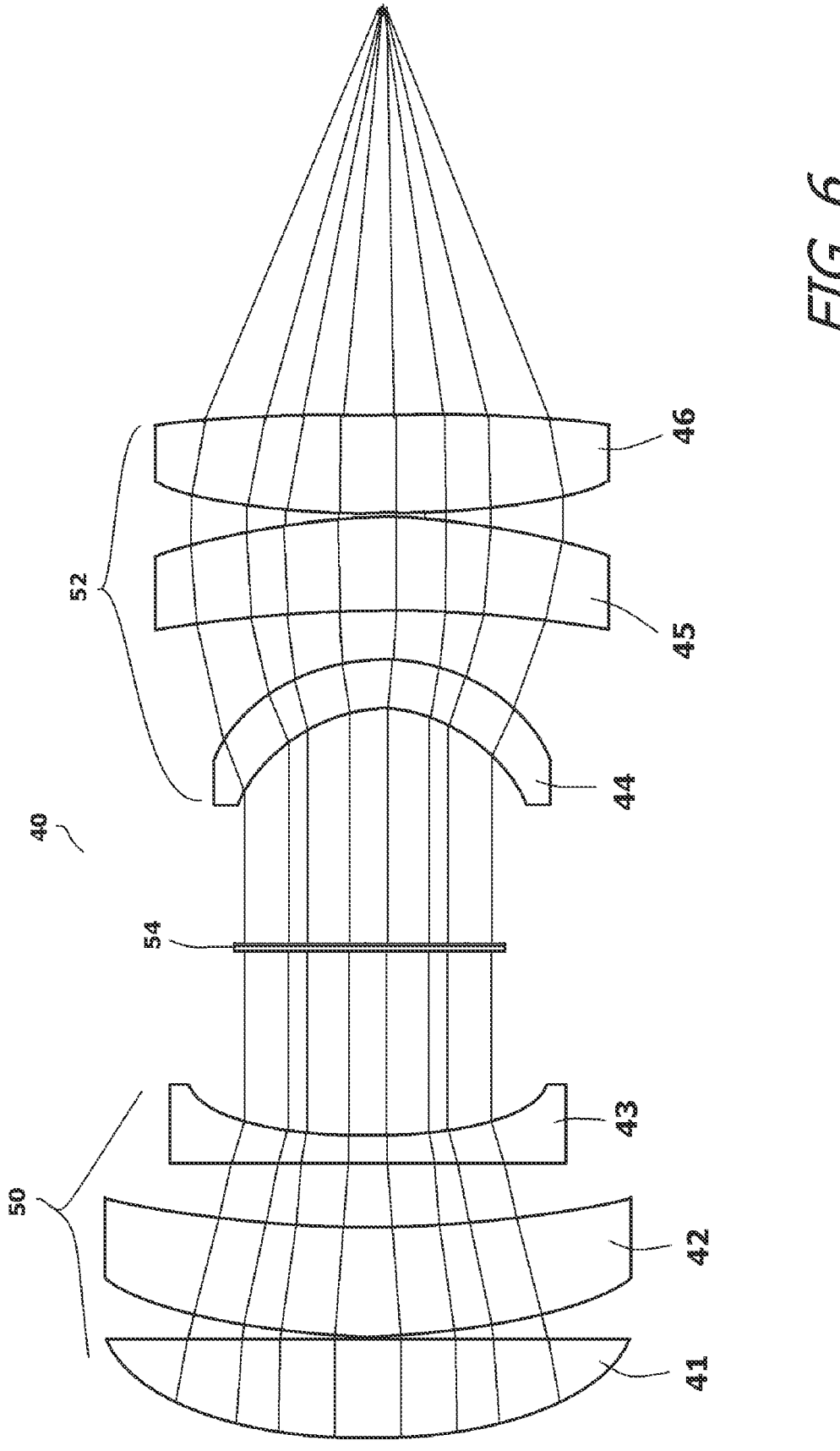
FIG. 6 shows a second exemplary embodiment of a lens assembly that contains both refractive lenses and a metalens.

Referring to FIG. 6, an alternate embodiment of a lens assembly 40 is shown. In this embodiment, the lens assembly 40 contains six refractive lens elements 41, 42, 43, 44, 45, 46 that are configured into a double Gauss lens configuration. Double Gauss lens configurations are well known in optics and are commonly used in camera lenses to reduce monochromatic aberrations over a large focal plane. The lens assembly 40 has two Gauss lens arrangements 50, 52. The lens assembly 40 of the exemplary embodiment has an f-number of 3 and a 30-degree field of view.

Figure 7:
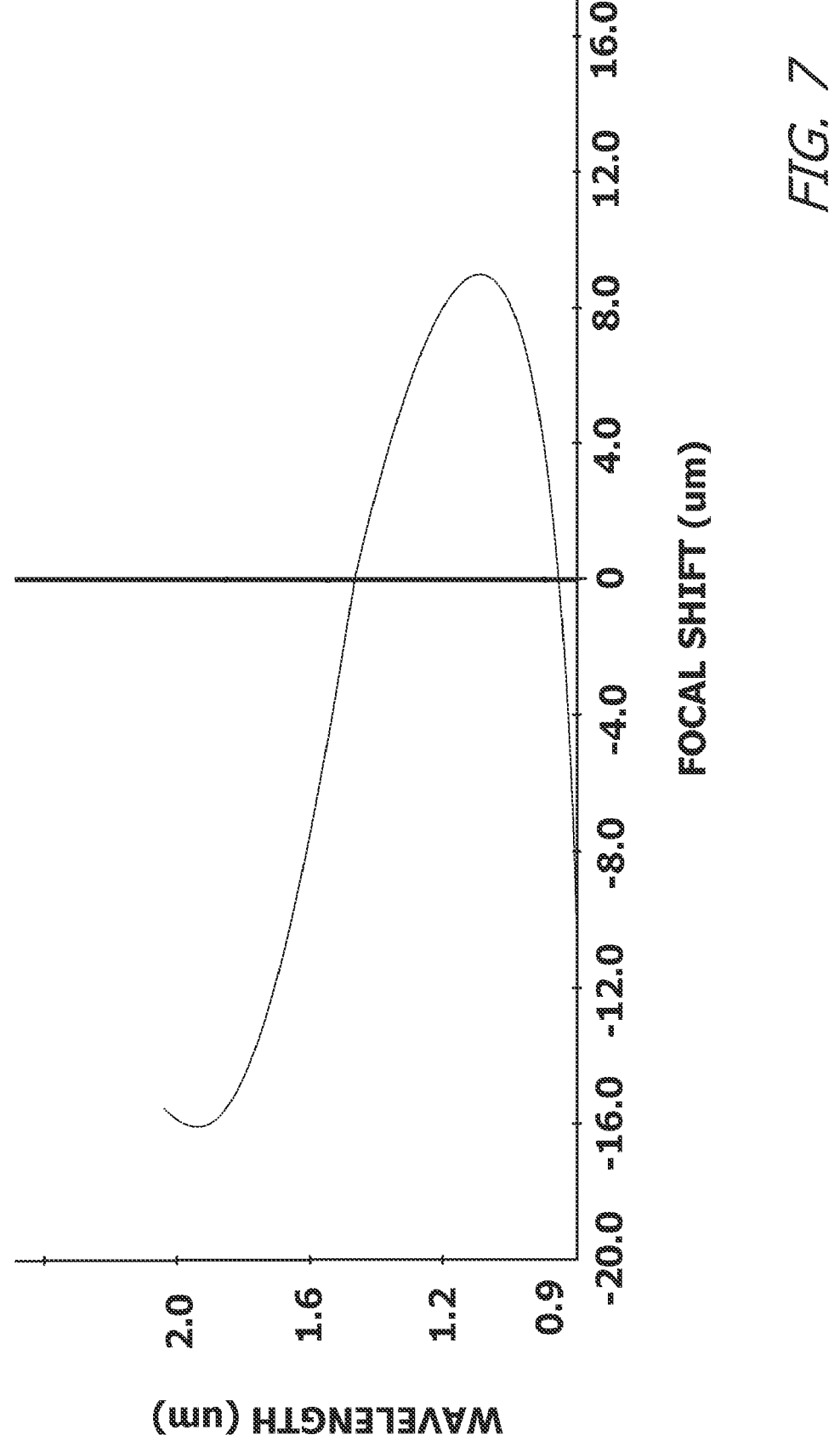
FIG. 7 is a graph that illustrates the correction to wavefront errors produced by a metalens in the exemplary embodiment of FIG. 6.
Figure 8:
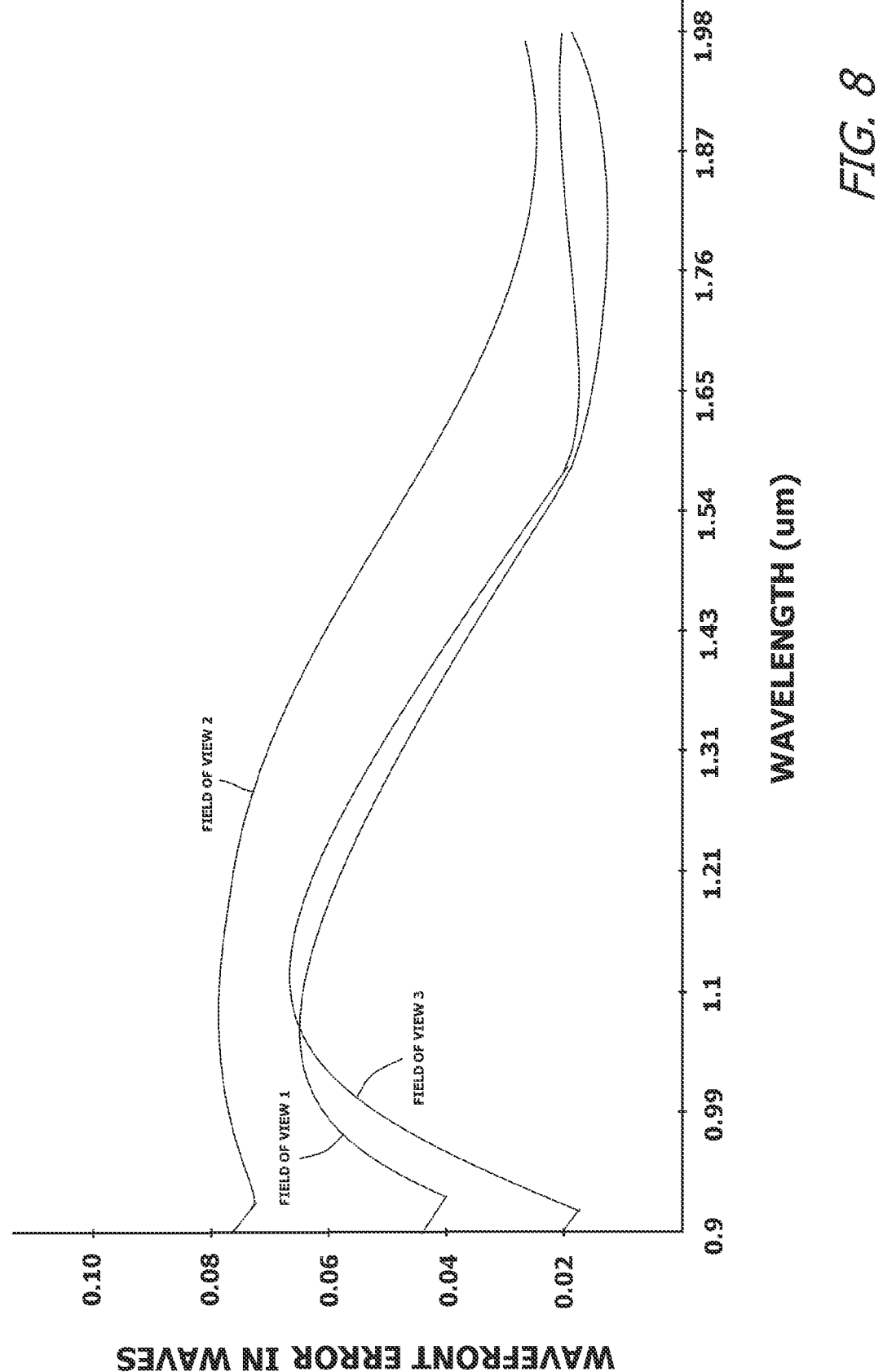
FIG. 8 is a graph that illustrates the correction to focal shift errors produced by a metalens in the exemplary embodiment of FIG. 6.

A metalens 54 is positioned between the first Gauss lens arrangement 50 and the second Gauss lens arrangement 52. All the lens elements 41, 42, 43, 44, 45, 46 in both Gauss lens arrangements 50, 52 are made from the same refractive material. The preferred refractive material for all lenses is N-SK14, which has an index of refraction of 1.6. Normally, six lens elements of the same material arranged in a double Gause lens arrangement would produce a significant focal shift and wavefront errors. However, with the metalens 54 in place between the first Gauss lens arrangement 50 and the second Gauss lens arrangement 52, the chromatic focal length shift is minimal. Referring to FIG. 7 in conjunction with FIG. 6, it can be seen that a focal shift of only approximately 20 micrometers from a wavelength of 0.9 micrometer to 2 micrometer occurs. Referring to FIG. 8 in conjunction with FIG. 4, it can be seen that the presence of the metalens 54 corrects the wavefront error towards long and short wavelengths.

Figure 5:
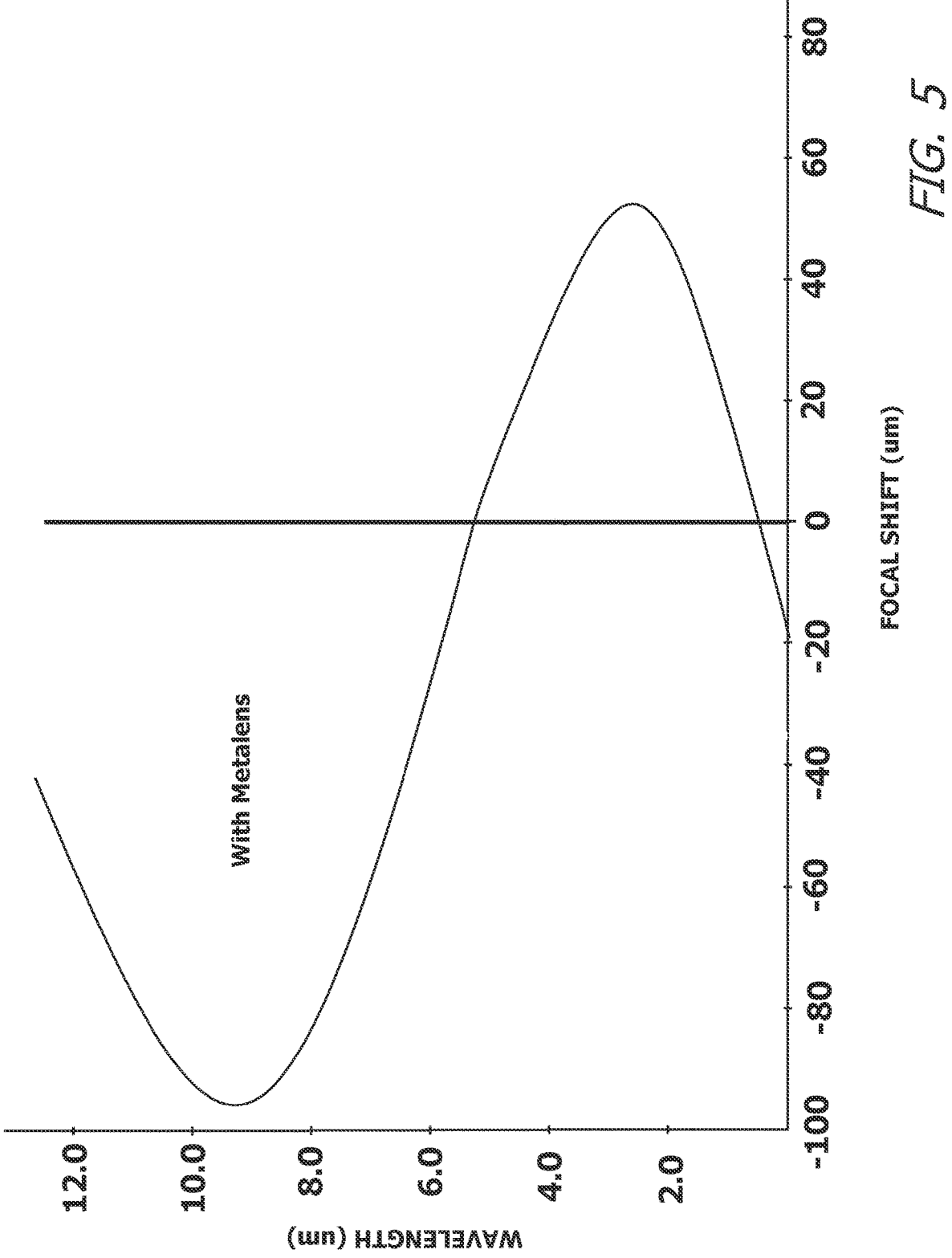
FIG. 5 is a graph that illustrates the correction in focal shift errors produced by a metalens for comparison with FIG. 3.

In relation to the embodiment of FIG. 1 and the embodiment of FIG. 5, it will be understood that the fabrication of metalenses offers several advantages over traditional manufacturing methods, including lower cost, increased accuracy, and greater design flexibility. The focusing power of a metalens is provided by the arrangement and geometric parameters of their constituent structures, which can be engineered to achieve a wide range of focal lengths and apertures. These unique features enable the same design and manufacturing processes to be used to fabricate metalenses in different wavelength regions of interest, as long as there exists a transparent material for the metalens structure in the frequencies being passed.

Additionally, the use of metalenses enables the development of compact, lightweight optical systems with fewer components and simpler designs. Large-scale metalens manufacturing has been shown to be feasible on a 12-inch wafer platform, therein providing for mass production of the metalenses. Therefore, the use of metalenses can offer a cost-effective, compact, and high-performance solution to the challenges posed by traditional infrared lenses.

It will be understood that the embodiments of the present invention that are illustrated and described are merely exemplary and that a person skilled in the art can make many variations to those embodiments. There are many objective lens configurations in use in addition to the Cooke triplet and double Gauss lens configurations illustrated. The use of a metalens can be included in most known lens assemblies that otherwise use corrective lens elements and mixed glass types to correct for chromatic and monochromatic aberrations. All such embodiments are intended to be included within the scope of the present invention as defined by the claims.

What is claimed is:

1. A lens assembly that corrects for chromatic aberrations and monochromatic aberrations in light passing through said lens assembly, comprising:

a plurality of refractive lens elements that are all fabricated from a common refractive material, wherein said plurality of refractive lens elements optically correct for at least some of said monochromatic aberrations;

a metalens positioned between two refractive lens elements that are contained within said plurality of refractive lens elements, wherein said metalens optically corrects for at least some of said chromatic aberrations.

2. The lens assembly according to claim 1, wherein said plurality of refractive lens elements create wavefront errors in said light passing through said lens assembly due to said common refractive material, wherein said metalens corrects said light for at least some of said wavefront errors.

3. The lens assembly according to claim 2, wherein said plurality of refractive lens elements create focal shifts in said light passing through said lens assembly due to said common refractive material, wherein said metalens corrects said light for at least some of said focal shifts.

4. The lens assembly according to claim 3, wherein said light passing through said lens assembly is infrared light.

5. The lens assembly according to claim 4, wherein said common refractive material has a group velocity dispersion of zero at a wavelength band between 3 um to 14 um.

6. The lens assembly according to claim 4, wherein said metalens is a metasurface formed on a substrate, wherein said substrate is transparent to said infrared light.

7. The lens assembly according to claim 4, wherein said infrared light is mid-infrared, having wavelengths between 3 um and 5 um, wherein said common refractive material is selected from a group consisting of zinc selenide glass and zinc sulfide glass.

8. The lens assembly according to claim 4, wherein said infrared light is far-infrared, having wavelengths between 8 um and 14 um, wherein said common refractive material is a chalcogenide glass that contains elements selected from a group consisting of germanium, antimony, arsenic, and selenium.

9. A lens assembly that corrects for chromatic aberrations and monochromatic aberrations in infrared light passing through said lens assembly, comprising:

a plurality of refractive lens elements that optically correct for at least some of said monochromatic aberrations;

a metalens that optically corrects for at least some of said chromatic aberrations.

10. The lens assembly according to claim 9, wherein said plurality of refractive lens elements are fabricated from a common refractive material.

11. The lens assembly according to claim 9, wherein said plurality of refractive lens elements include two refractive lenses between which said metalens is interposed.

12. The lens assembly according to claim 11, wherein said plurality of refractive lens elements create wavefront errors in said infrared light passing through said lens assembly, wherein said metalens corrects said light for at least some of said wavefront errors.

13. The lens assembly according to claim 11, wherein said plurality of refractive lens elements create focal shifts in said light passing through said lens assembly, wherein said metalens corrects said light for at least some of said focal shifts.

14. The lens assembly according to claim 9, wherein said metalens is a metasurface formed on a substrate, wherein said substrate is transparent to said infrared light.

15. The lens assembly according to claim 9, wherein said infrared light is mid-infrared, having wavelengths between 3 um and 5 um, wherein said plurality of refractive lens elements are made from a common refractive material that is selected from a group consisting of zinc selenide glass and zinc sulfide glass.

16. The lens assembly according to claim 9, wherein said infrared light is far-infrared, having wavelengths between 8 um and 14 um, wherein said plurality of refractive lens elements are made from chalcogenide glass that contains elements selected from a group consisting of germanium, antimony, arsenic, and selenium.

17. The lens assembly according to claim 10, wherein said common refractive material has a group velocity dispersion is zero at a wavelength band between 3 um to 14 um.

18. A method of forming a lens assembly that corrects for chromatic aberrations and monochromatic aberrations in light passing through said lens assembly, said method comprising:

providing refractive lens elements that are all fabricated from a common refractive material, and are both shaped and oriented to optically correct for at least some of said monochromatic aberrations;

positioning a metalens among said refractive lens elements, wherein said metalens optically corrects for at least some of said chromatic aberrations.

19. The method according to claim 18, wherein said refractive lens elements create wavefront errors in said light passing through said lens assembly due to said common refractive material, wherein said metalens corrects said light for at least some of said wavefront errors.

20. The method according to claim 18, wherein said refractive lens elements create focal shifts in said light passing through said lens assembly due to said common refractive material, wherein said metalens corrects said light for at least some of said focal shifts.

\* \* \* \* \*